Patented Mar. 31, 1931

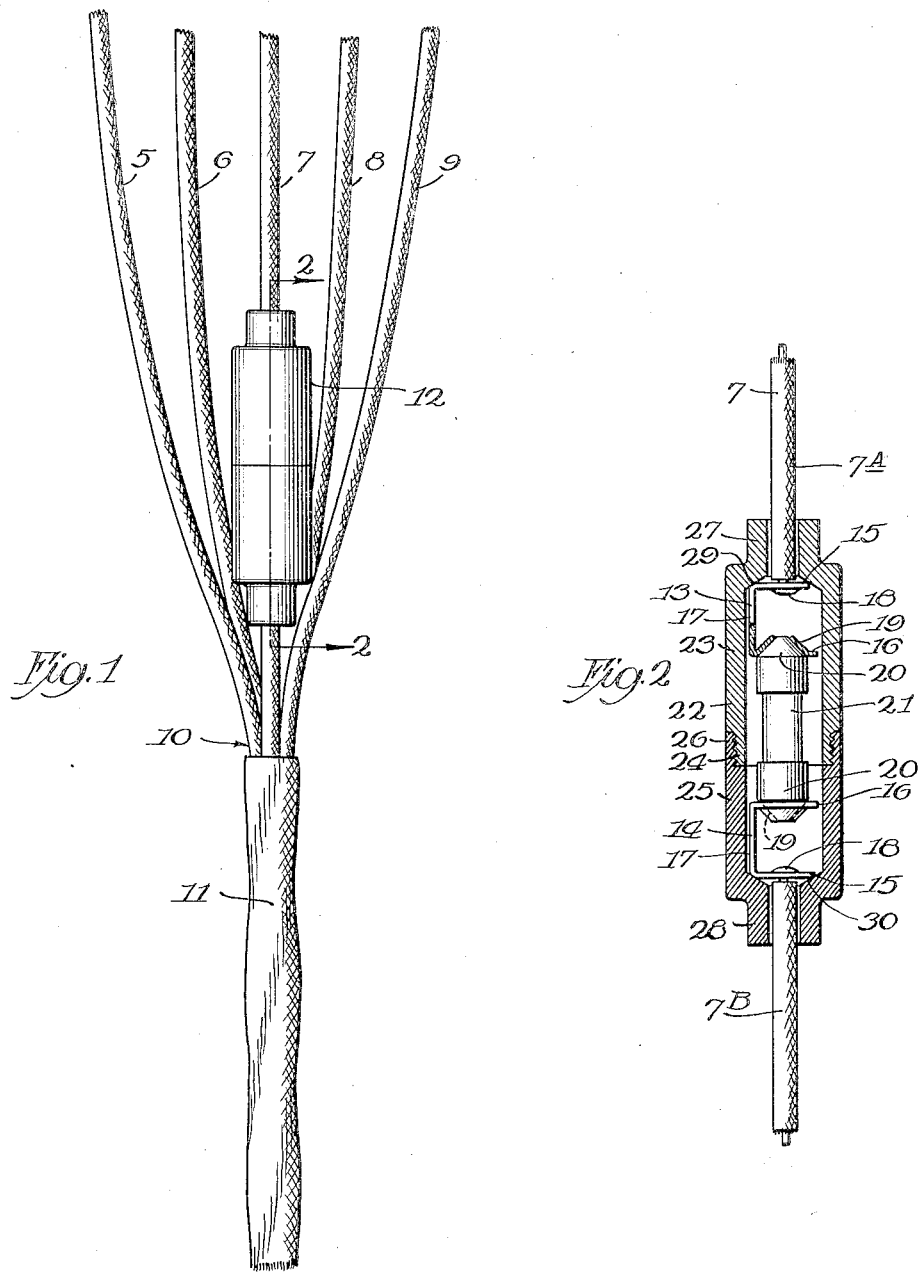

1,798,860

UNITED STATES PATENT OFFICE

JAMES E. WOODRUFF, OF CHICAGO, ILLINOIS, ASSIGNOR TO BELDEN MANUFACTURING COMPANY, OF CHICAGO, ILLINOIS, A CORPORATION OF ILLINOIS

ELECTRIC CABLE

Application filed April 15, 1927. Serial No. 183,985.

This invention relates to electric cables, and more particularly to cables having a plurality of relatively insulated conductors grouped together and covered by a single covering, such cables being particularly adapted to use in connection with radio receiving sets.

The principal objects of the invention are to provide means in a cable of the above described class for preventing an overload of electrical current from reaching certain parts of the radio set whereby such parts might be seriously damaged, and to provide a fuse or other circuit breaking means, included in the circuit of one of the conductors which constitute the cable, and supported solely by the conductor so that the cable may readily be moved as desired without the necessity of disconnecting the cable from any fixedly mounted fuse or other circuit breaking means.

Other objects of the invention are to provide means included in the circuit of a conductor for preventing the passage of excessive electric currents therethrough, which means will be relatively simple, easily and inexpensively manufactured, easily assembled, and in which the current limiting means may be readily changed from one capacity to another.

Other objects and advantages of the invention will be understood by reference to the following specification and accompanying drawing in which I have illustrated a cable comprising a plurality of conductors, one of which conductors is provided with current limiting means such as contemplated by the present invention and in which drawing:

Fig. 1 is a side elevation, and

Fig. 2 is a longitudinal section through the axis of the current limiting means.

Referring now to the drawing, I have illustrated in Fig. 1 a portion of a cable such as is frequently used in connection with radio receiving sets for the purpose of conducting current from the A and B batteries to the set and also for connecting the aerial and ground terminals of the set to the aerial and ground leads as in usual practice. The cable comprises a plurality of conductors 5, 6, 7, 8 and 9 grouped together as indicated at 10 and covered by a single covering 11 preferably of braided material.

One of the conductors, for instance, the conductor 7 is used for conducting current from the A battery to the filament of one or more radio tubes, which usually require a relatively low voltage. In order to prevent an excessive current from entering the filament circuit or other parts of the receiving set in the event of a short circuit in the set itself or an improper connection at either end of the cable, I provide a fuse mounting indicated at 12 in the circuit of the said conductor 7.

Referring more particularly to Fig. 2, the conductor 7 is severed, and U-shaped members 13 and 14 are connected respectively to the end portions 7—A and 7—B of the said conductor 7. The U-shaped members 13 and 14 each comprise leg members 15 and 16 and connecting portion 17. The leg member 15 of each of the members is connected to one of the conductor end portions by suitable means preferably soldering as indicated at 18, and the other leg member 16 of each U-shaped member is preferably provided with a conical recess indicated at 19 adapted to receive conical shaped end portions or terminals 20—20 of a suitable fuse 21.

The U-shaped members are retained in proper position to hold the fuse 21 by means of a casing or housing 22 which is supported solely by the conductor end portions 7—A and 7—B. The housing 22 is preferably a two-part housing comprising one part 23 having a reduced extension at one end provided with screw threading as indicated at 24, and another part 25 having an internally threaded extension indicated at 26. The threaded extensions 24 and 26 are adapted to be interlocked so as to hold the two parts 23 and 25 together, and each of the parts is provided with a reduced extension 27 and 28 respectively, through which the respective conductor portions pass to the interior of the housing where they are connected to the said legs 15 as above described.

Each of the housing parts 23 and 25 is provided with a shoulder 29 and 30 respectively, which is adapted to engage the leg 15 as the housing parts are interlocked and to thereby maintain the U-shaped members in predetermined properly spaced relation to hold the fuse 21 as above described.

The U-shaped members 13—14 are preferably made of relatively thin strips of metal so that the legs 15 and 16 of each will be somewhat resilient whereby the leg 16 of each is adapted to yield to some extent as the two housing parts are brought together and the fuse 21 clamped between the said leg members. By this means the fuse will be firmly held, and good electrical connection established between the terminal portions 20—20 of the fuse and the respective leg members. It will also be observed that the conical shaped recesses 19 will be effective to properly position the fuse with respect to the legs 16—16, the conical shaped terminal portions 20 serving to facilitate such positioning.

In assembling the above described fuse construction, the respective housing parts 23 and 25 are passed over the corresponding conductor portion, and a U-shaped member as 13 or 14 is then connected to each of the conductor ends. The housing parts are then moved along the conductor until the shoulders 29 and 30 engage the respective leg members 15. It will be noted from an inspection of Fig. 2 that the housing parts are so proportioned that the interior of the part 23 is somewhat deeper than the interior of the part 25. The fuse is preferably inserted into the deeper part 23, where the conical terminal 20 of the fuse will engage the conical recess 19 as above described. The other housing part 25 is then brought into engagement with the part 23 and interlocked therewith by means of the above described screw threading 24 and 26, whereby the conical recess in the leg 16 of the U-shaped member 14 will be caused to engage the corresponding terminal of the fuse. It will of course, be understood that during the placing of the fuse in the housing as above described, the part 23 will be held in such position that the fuse may be deposited therein and will be retained therein by the walls of the part until the other part 25 is interlocked with the part 23 as above described, whereby the fuse is positioned between the legs 16 of the members 13 and 14. I prefer to provide relatively long end extensions 27 and 28 so that flexing of the conductor wires will be prevented at their connections with the respective leg members 15 which flexing might otherwise tend to break the wire at the connections or to break the connections.

It will be understood that although I have described my fuse mounting structure in connection with cables particularly adapted to use with radio receiving sets, the structure is equally useful for the protection of other devices and need not be associated with cables such as above described, but may on the contrary, be used in connection with a single conductor.

I am aware that changes in the form, construction and arrangement of the above described structure may be made without departing from the spirit of the invention, the scope of which should be determined by reference to the following claims which should be construed as broadly as possible consistent with the state of the art.

I claim as my invention:

1. In a circuit breaker mounting means, the combination of a pair of metallic members adapted to be permanently electrically connected, respectively, to a pair of conductor portions, said members having means for receiving the circuit breaker in interlocking engagement, and a casing for enclosing said metallic members and the circuit breaker carried thereby, said casing comprising a pair of separable interlocked parts, said parts being independent of said metallic members and being adapted to be mounted respectively on adjacent portions of said conductors and forming, when interlocked, a rigid protective housing for said members and circuit breaker, and said casing parts having means for engaging said metallic members to hold same in operative position relative to the circuit breaker.

2. In means for removably mounting a fuse in the circuit of an electric conductor, the combination of a pair of metallic members adapted to be permanently electrically connected, respectively, to separate portions of the conductor, each member having a portion adapted to contact with one end of said fuse so as to connect the fuse in said circuit, and one of said members affording a yielding end engagement with the fuse, and means adapted to be carried by the conductor for holding said metallic member in operative position relative to the fuse.

3. In means for removably mounting a fuse in the circuit of an electric conductor, the combination of a pair of substantially U-shaped metallic members, one of the legs of each of said members being adapted to be connected to respective separated portions of the said conductor, and the opposite legs being provided with means for receiving a terminal portion of the fuse and interlocking therewith so as to position the fuse therebetween, and so as to prevent sidewise displacement thereof with respect to said U-shaped members, and a housing for said fuse and U-shaped members, carried by said conductor and adapted to hold said members in operative position relative to the fuse.

4. In means for mounting a fuse in the circuit of an electric conductor, the combination of a pair of metallic, substantially U-shaped members, each having a leg portion adapted to be connected to respective separated portions of the conductor and the opposite leg provided with a conical recess for receiving an end portion of the fuse, means for positioning said U-shaped members with said conical recesses substantially coaxial with each other comprising a housing having a pair of separable interlocked parts adapted to be carried respectively by said separated conductor portions, and each of said parts being provided with a shoulder for engaging the adjacent leg of the adjacent U-shaped member, said shoulders being effective, when the parts are interlocked, to hold the U-shaped members in said position with the fuse seated in said conical recesses.

5. In means for mounting a fuse in the circuit of an electric conductor, the combination of a pair of substantially U-shaped metallic members, each having one leg adapted to be connected to respective separated portions of the conductor, and the opposite leg being provided with a conical recess for receiving an end portion of the fuse, a housing comprising a pair of separable interlocked tubular members, each provided with stop means for positioning the adjacent U-shaped member therein, and whereby the members are held in operative position with the fuse therebetween when said parts are interlocked, the conical recesses in said legs and the conical end portions of said fuse serving to facilitate seating of the fuse ends in said recesses.

6. In means for mounting a fuse in the circuit of an electric conductor, the combination of a casing adapted to be carried by the conductor and including a tubular part provided with a contact member removably seated therein adjacent one end and adapted to be electrically connected to a part of the conductor, and another contact member adapted to be electrically connected to another part of the conductor and removably mounted in the other end of said tubular part, a second casing part adapted to be interlocked with said tubular part for holding said second contact member in place, and said tubular part being adapted to receive the fuse with one end contacting with the contact member seated therein and with the other end contacting with said second-mentioned contact member.

JAMES E. WOODRUFF.